(12) United States Patent
Wu

(10) Patent No.: US 7,971,344 B2
(45) Date of Patent: Jul. 5, 2011

(54) DEVICE FOR ASSEMBLING LENS ASSEMBLY

(75) Inventor: Yung-Teng Wu, Taipei Hsien (TW)

(73) Assignee: Hon Hai Precision Industry Co., Ltd., Tu-Cheng, New Taipei (TW)

(*) Notice: Subject to any disclaimer, the term of this patent is extended or adjusted under 35 U.S.C. 154(b) by 834 days.

(21) Appl. No.: 12/018,739

(22) Filed: Jan. 23, 2008

(65) Prior Publication Data

US 2009/0019684 A1 Jan. 22, 2009

(30) Foreign Application Priority Data

Jul. 18, 2007 (CN) .......................... 2007 1 0201118

(51) Int. Cl.
*B23P 19/00* (2006.01)
*B23Q 3/00* (2006.01)

(52) U.S. Cl. ............. 29/700; 29/238; 29/271; 29/281.4; 29/464; 29/466; 29/468; 359/819

(58) Field of Classification Search .................... 29/468, 29/464, 466, 700, 238, 271, 281.4; 359/809, 359/819

See application file for complete search history.

(56) References Cited

U.S. PATENT DOCUMENTS

| | | | | |
|---|---|---|---|---|
| 2,266,169 A | * | 12/1941 | Crumrine | 249/95 |
| 3,466,728 A | * | 9/1969 | Werner | 29/281.4 |
| 3,599,377 A | * | 8/1971 | Dartnell | 451/43 |
| 4,046,458 A | * | 9/1977 | Smulders et al. | 359/819 |
| 6,122,114 A | * | 9/2000 | Sudo et al. | 359/819 |
| 6,204,979 B1 | * | 3/2001 | Matsui | 359/819 |
| 6,695,775 B2 | * | 2/2004 | Watanabe et al. | 600/176 |
| 6,757,112 B1 | | 6/2004 | Whitty | |
| 7,567,393 B2 | * | 7/2009 | Chen et al. | 359/809 |
| 7,715,126 B2 | * | 5/2010 | Apel et al. | 359/819 |
| 7,876,512 B2 | * | 1/2011 | Wong et al. | 359/818 |
| 7,894,146 B2 | * | 2/2011 | Komi et al. | 359/819 |
| 2006/0087751 A1 | * | 4/2006 | Liu et al. | 359/819 |
| 2007/0253077 A1 | * | 11/2007 | Ayame et al. | 359/811 |
| 2009/0269009 A1 | * | 10/2009 | Tanaka | 385/39 |

* cited by examiner

Primary Examiner — Essama Omgba
(74) Attorney, Agent, or Firm — Frank R. Niranjan

(57) ABSTRACT

A device for assembling a lens assembly includes a base, a barrel having a bottom, a universal joint disposed between the base and the bottom of the barrel, a push rod, and a resilient member. The universal joint is configured for allowing the barrel to tilt in any direction. The push rod is configured for depressing the lenses received to the barrel to form a lens barrel. The resilient member is disposed between the base and the bottom of the barrel. In process of assembling lenses, when the push rod presses the lenses received in the barrel, the lens assembly can hold the axis of the lenses in coaxial alignment under the cooperation of the universal joint and exert a uniformity force on a surface of the lenses. The lens assembly can eliminate the risk of breakage of the lenses and accurately position the lenses.

7 Claims, 5 Drawing Sheets

DEVICE FOR ASSEMBLING LENS ASSEMBLY

RELATED FIELD

The present invention relates generally to a device for assembling a lens assembly.

BACKGROUND

With the development of science and technology, portable electronic devices, such as mobile telephones, personal digital assistants (PDAs) or the like are now in widespread use. Portable electronic devices including image capture devices are becoming increasingly fashionable. Device for assembling lens module is an important factor in performance of the lens modules to capture images. Therefore, an improvement in the device will help to improve the quality and ease with which the lens module captures images.

Generally, a lens module, as shown in FIG. 4, includes a lens barrel 31, a number of optical elements, such as lenses 32, and at least a spacer 33 for spacing the lenses 32, received in the lens barrel 31. In assembly, firstly, the lenses 32 and the spacer 33 are press fit together to form a lens unit using a cylinder 401 and a push rod 41 as shown in FIG. 5. Then, the lens unit is inserted into the lens barrel 31.

However, in the process of press fitting the lenses 32 and the spacer 33 together in the cylinder 401, the lenses 32 may not be level in the cylinder 401, due to factors such as dimension error or improper manual operation. This results in a failure to accurately position the lenses 32 and the spacer 33 relative to each other.

It is desired to provide a device for assembling a lens assembly which can overcome the above-described deficiency.

SUMMARY

According to the present invention, a device for assembling a lens assembly includes a base, a barrel configured for receiving a plurality of lenses, a universal joint, a push rod, and an resilient member. The barrel has a bottom and the lenses are aligned with an optical axis. The universal joint is interconnected between the base and the bottom of the barrel which allows the barrel to tilt in any direction. The center axis of the universal joint is aligned with the optical axis. The push rod is configured for depressing the lenses into the barrel to form a lens assembly. The resilient member is disposed between the base and the bottom of the barrel and surrounds the universal joint.

Other novel features and advantages will become more apparent from the following detailed description when taken in conjunction with the accompanying drawings.

BRIEF DESCRIPTION OF THE DRAWINGS

The present invention is described in detail hereinafter, by way of example and description of preferred and exemplary embodiments thereof and with reference to the accompanying drawings, in which.

DETAILED DESCRIPTION OF THE PREFERRED EMBODIMENTS

A detailed explanation of a device for assembling a lens assembly according to each of various embodiments of the present invention will now be made with reference to the drawings attached hereto.

Figure 1:
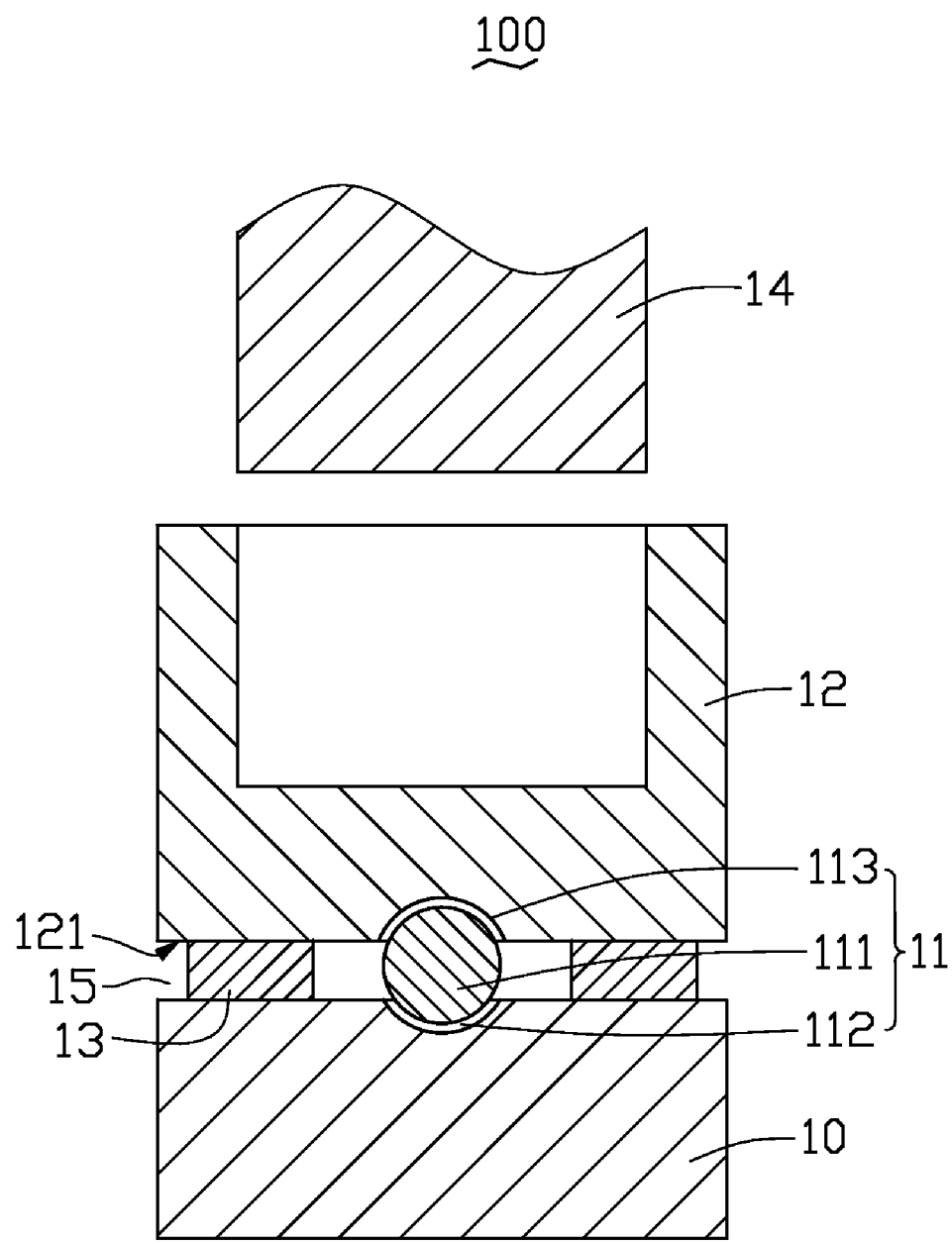
FIG. 1 is a schematic, cross-sectional view of a device for assembling a lens assembly according to a first embodiment of the present invention.

Referring to FIG. 1, a device 100 for assembling a lens assembly according to a first embodiment of the present invention is shown. The device 100 includes a base 10, a universal joint 11 connected to the base 10, a barrel 12 having a bottom 121, an resilient member 13 disposed between the base 10 and the bottom 121 of the barrel 12, and a push rod 14.

The base 10 is fixed on a machine (not shown) and is configured for supporting the barrel 12. The barrel 12 is configured for receiving a number of lenses 32. Understandably, the lenses 32 are aligned with an optical axis. It can be appreciated that an inner diameter of the barrel 12 is essentially equal to an external diameter of the lenses 32, thus facilitating a tight contact between the inner surface of the barrel 12 and the outer surface of the lenses 32.

The universal joint 11 is disposed between the base 10 and the bottom of the barrel 12 and configured for allowing the barrel 12 to tilt in any direction. The center axis of the barrel 12 is aligned with the optical axis. The universal joint 11 includes a ball 111, a first ball socket 112, and a second ball socket 113. The first and second ball socket 112, 113 are configured for receiving the ball 111 and coaxially contacted with the ball 111. The first ball socket 112 is coaxially arranged on the base 10. It can be appreciate that the first ball socket 112 is integrally formed with the base 10. The second ball socket 113 is arranged on the bottom 121 of the barrel 12. It can be appreciated that the ball socket 113 is integrally formed with the barrel 12. A shape of the inner surface of the first and second ball sockets 112, 113 can be arced, tapered, and the like. In the present embodiment, the shapes of the inner surface of the first and second ball sockets 112, 113 are arced. A diameter of the ball 111 is greater than a total of arch rise of the first, second ball sockets 112, 113. Thus, a gap 15 is formed between the base 10 and the bottom 121 of the barrel 12 to facilitate movement of the barrel 12.

The resilient member 13 is disposed in the gap 15 between the base 10 and the bottom 121 of the barrel 12. The resilient member 13 can be a spring or a ring-shaped elastic rubber. In the embodiment, the resilient member 13 is a ring-shaped elastic rubber and is shaped to form an enclosure to surround the universal joint 11. The barrel 12 can be repositioned due to elasticity of the resilient member 13 when assembly is finished and can also be configured for reducing an impact from the push rod 14.

The push rod 14 can be cylindrical (hollow or otherwise), square, or rectangular. In present embodiment, the push rod 14 is a hollow cylinder. It can be appreciated that a diameter of the push rod 14 is less than that of the lenses, and a center axis of the push rod 14 is aligned with that of the barrel 12. The push rod 14 is mounted on the machine (not shown) and is movable up and down relative to the barrel 12.

Figure 2:
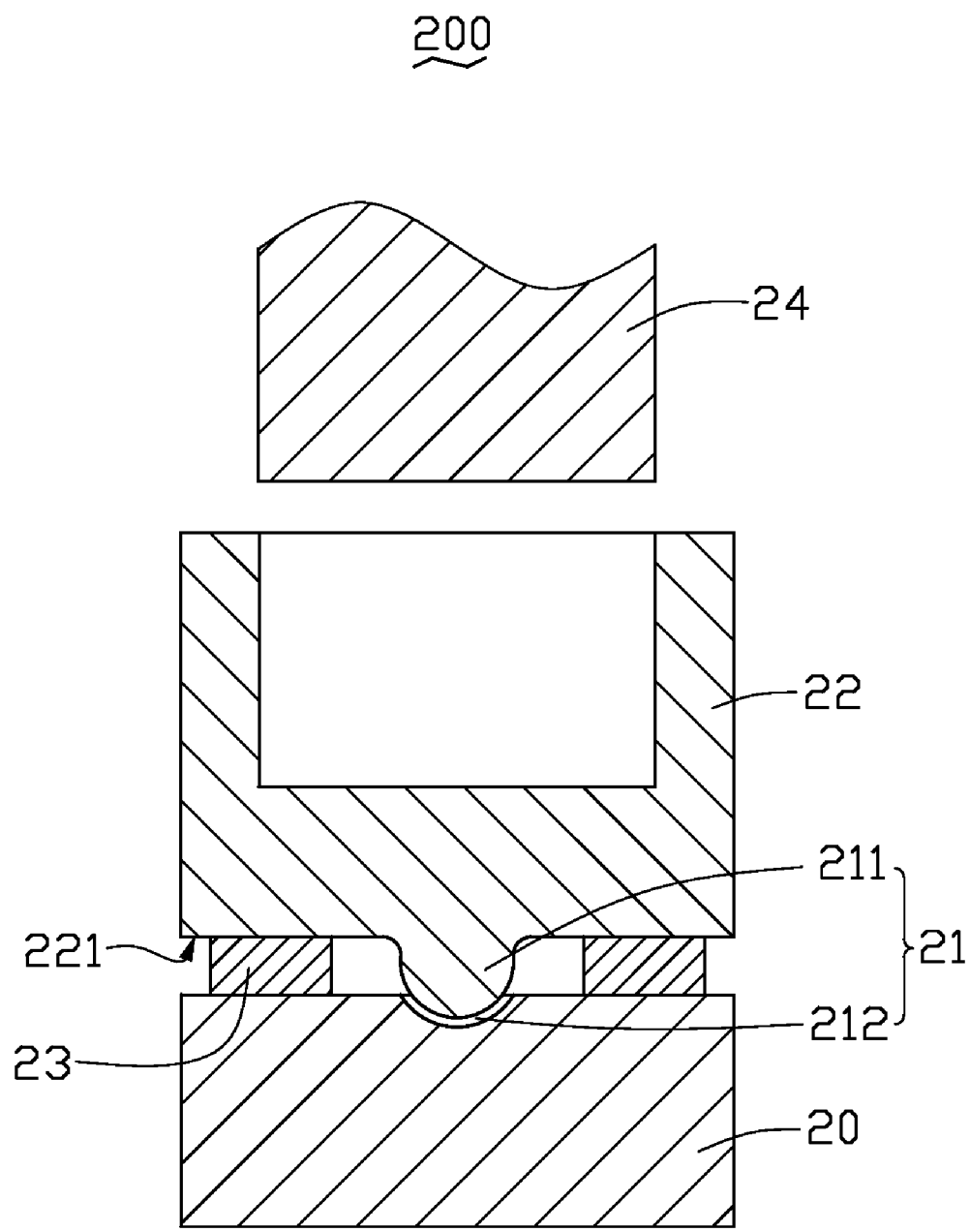
FIG. 2 is a schematic, cross-sectional view of a device for assembling a lens assembly according to a second embodiment of the present invention.

Referring to FIG. 2, a device 200 for assembling lenses 32 according to a second embodiment of the present invention is shown. The device 200 includes a base 20, a universal joint 21 connected to the base 10, a barrel 22 having a bottom 221, an resilient member 23 disposed between the base 20 and the bottom 221 of the bottom 221 of the barrel 22, and a push rod 24.

The difference between the first embodiment and the second embodiment is the configuration of the universal joints 11, 21. The universal joint 21 includes a protrusion 211 having a ball-shaped distal end and a ball socket 212 configured for receiving the ball-shaped distal end of the protrusion 211. The protrusion 211 can be connected to the base 20 or the barrel 22. In the present embodiment, the protrusion 211 is connected to the bottom 221 of the barrel 22 and the ball socket 212 is connected to the base 20. In particular, the protrusion 211 is integrally formed with the barrel 22 and the ball socket 212 is integrally formed with the base 20. As illustrated in the first embodiment, the center axis of the universal joint 21 is aligned with that of the barrel 22.

Figure 3:
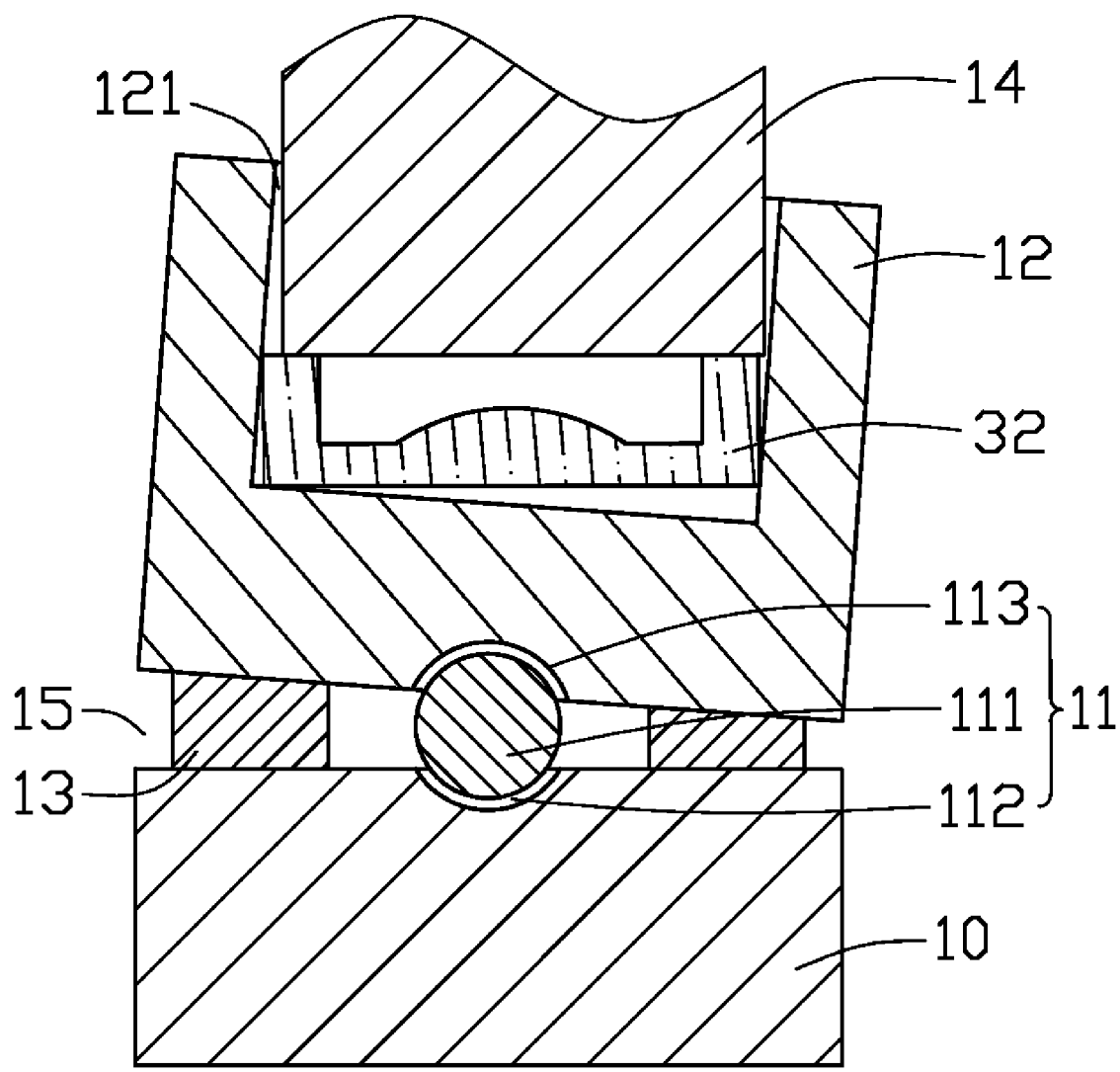
FIG. 3 is a similar to FIG. 1, but showing a lens received in a barrel of the device for assembling the lens assembly.
Figure 4:
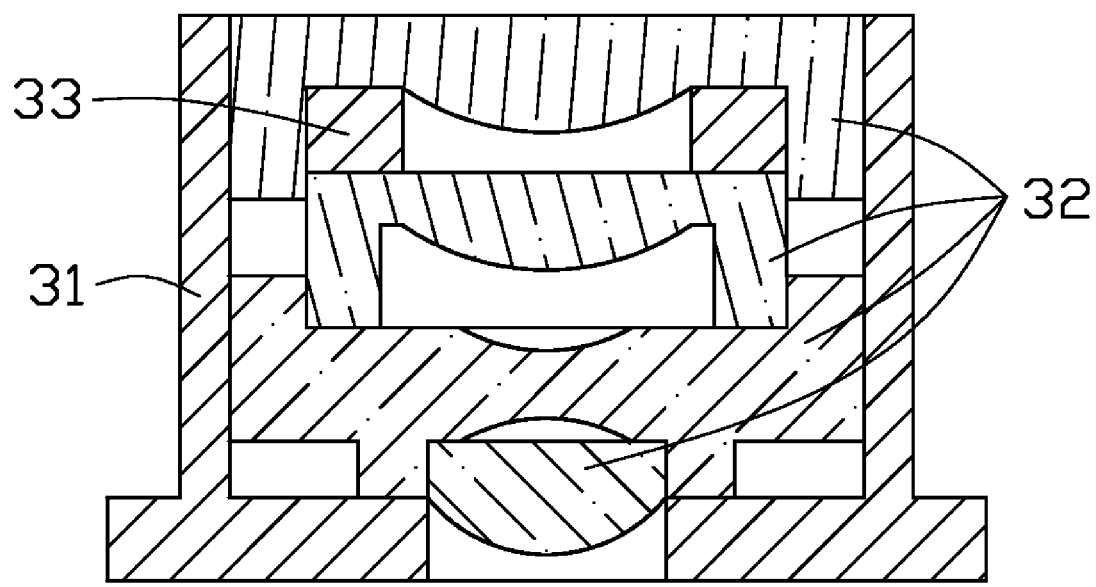
FIG. 4 is a schematic, cross-section view of a conventional lens unit of a lens module.
Figure 5:
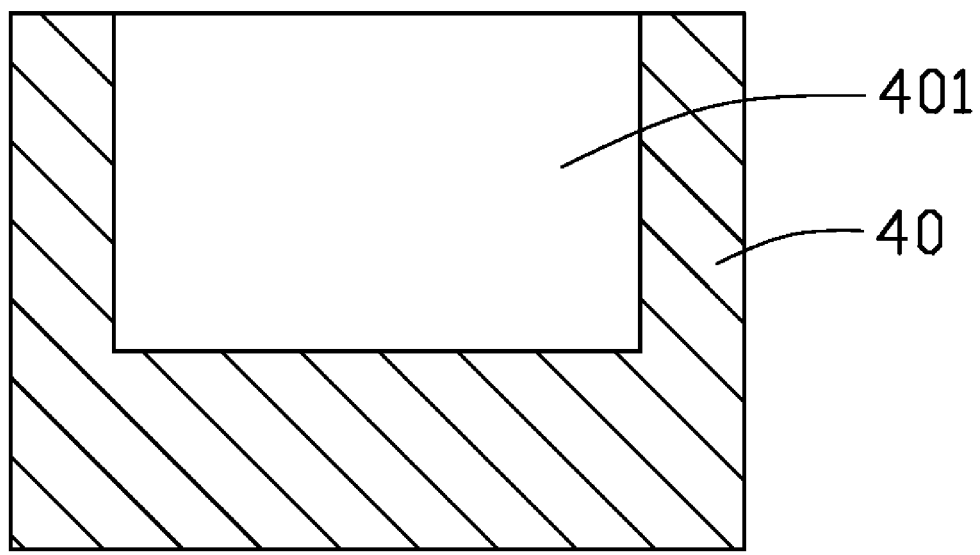
FIG. 5 is a schematic, cross-section view of a conventional lens assembly device for assembling the lens unit of FIG. 4.

Referring to FIG. 3, optical elements, such as a lens, received in a barrel 12 of the device 100 is shown. The first embodiment is presented as an example to explain the work principle of the devices 100, 200. When the center axes of the lenses 32 received in the barrel 12 are not parallel with that of the barrel 12, the barrel 12 will tilt in response to downward pressure applied by the push rod 14. Thus, the center axis of the push rod 14 aligns with that of the lenses 32, so that the force of the downward pressure from the push rod 14 is evenly distributed across a surface of the lenses 32 so that the lenses 32 are not damaged as they are forced into position.

It should be noted that when the lens assembly has been finished, the finished lens assembly can be taken out via a jig, such as a suction nozzle, from the barrel 12 or the barrel 22. Then a next process, such as assembling the finished lens assembly into a lens barrel, may commence.

As described above, in process of press fitting the lenses, when the push rod presses the lenses received in the barrel, the device can hold the axis of the lenses in coaxial alignment under the cooperation of the universal joint and exert an uniformity force on the surface of the lenses. The device can eliminate the risk of breakage of the lenses and accurately position the lenses.

It should be understood that the above-described embodiment are intended to illustrate rather than limit the invention. Variations may be made to the embodiments without departing from the spirit of the invention. Accordingly, it is appropriate that the appended claims be construed broadly and in a manner consistent with the scope of the invention.

What is claimed is:

1. A device for assembling a lens assembly, the device comprising:
   a base;
   a barrel configured for receiving a plurality of lenses therein, the barrel having a bottom, the lenses being aligned with an optical axis;
   a universal joint interconnected between the base and the bottom of the barrel and configured for allowing the barrel to tilt in any direction, and a center axis of the universal joint being aligned with the optical axis;
   a push rod configured for depressing the lenses received into the barrel to form a lens assembly; and
   a resilient member disposed between the base and the bottom of the barrel, the resilient member surrounding the universal joint therein.

2. The device as claimed in claim 1, wherein the universal joint comprises a ball, a first shell socket arranged on the base, and a second ball socket arranged on the bottom of the barrel, the ball interposed between the first and second ball sockets.

3. The device as claimed in claim 2, wherein the first and second ball sockets are respectively integrally formed with the base and the bottom of the barrel.

4. The device as claimed in claim 1, wherein the universal joint comprises a protrusion having a ball-shaped distal end and a ball socket arranged on the base, the ball socket configured for receiving the ball-shaped distal end of the protrusion.

5. The device as claimed in claim 1, wherein the elastic member is a ring-shaped elastic rubber.

6. The device as claimed in claim 5, wherein the elastic member is arranged in a circle centered at the universal joint.

7. The device as claimed in claim 1, wherein the resilient member includes a plurality of springs.

\* \* \* \* \*